(12) United States Patent
Hidume (10) Patent No.: US 8,896,482 B2
(45) Date of Patent: Nov. 25, 2014

(54) OBJECT DETECTION METHOD (75) Inventor: Takayuki Hidume, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 591 days.

(21) Appl. No.: 13/376,116

(22) PCT Filed: May 21, 2010

(86) PCT No.: PCT/JP2010/058604
§ 371 (c)(1),
(2), (4) Date: Mar. 2, 2012

(87) PCT Pub. No.: WO2010/143513
PCT Pub. Date: Dec. 16, 2010

(65) Prior Publication Data
US 2012/0146839 A1 Jun. 14, 2012

(30) Foreign Application Priority Data
Jun. 9, 2009 (JP) ................................. 2009-137829

(51) Int. Cl.
*G01S 13/08* (2006.01)
*G01S 13/93* (2006.01)
*G01S 7/35* (2006.01)
*G01S 13/34* (2006.01)
*G01S 13/72* (2006.01)
(Continued)

(52) U.S. Cl.
CPC ............... *G01S 13/931* (2013.01); *G01S 13/72* (2013.01); *G01S 13/02* (2013.01); *G01S 7/354* (2013.01); *G01S 13/20* (2013.01); *G01S 13/345* (2013.01); *G01S 2013/9346* (2013.01)
USPC ...................................................... 342/146

(58) Field of Classification Search
CPC . G01S 13/02; G01S 13/72; G01S 2013/9346; G01S 13/345; G01S 13/20; G01S 13/931; G01S 7/354
USPC .......................................................... 342/146
See application file for complete search history.

(56) References Cited

U.S. PATENT DOCUMENTS 4,973,968 A 11/1990 Hurd
5,923,282 A 7/1999 Honma et al.
(Continued)

FOREIGN PATENT DOCUMENTS

DE 811 470 A 4/1959
JP 11-64497 A 3/1999
(Continued)

OTHER PUBLICATIONS

Supplementary Search Report issued in European Application No. 10 78 6044, dated Jan. 23, 2013, 2 pages.

*Primary Examiner* — Frank J McGue
(74) *Attorney, Agent, or Firm* — Westerman, Hattori, Daniels & Adrian, LLP (57) ABSTRACT

A dummy target is set in a direction which is the same direction as that of a detected target and at the position whose distance is double that of the detected target; a second-order wave target detection area is set in the predetermined area including the position of the dummy target; the target detected in the second-order wave target detection area is judged as being a second-order wave target; a interpolated target is set in the direction which is the same as that of the second-order wave target, and at the position whose distance is half that of the second-order wave target; a fundamental wave target detection region is set in the predetermined area including the position of the interpolated target; and the interpolated target is outputted as a fundamental wave target in the case where no fundamental wave target is detected in the fundamental wave target detection region. Even if the fundamental wave target to be detected is undetected within a close range, data on the fundamental wave target is estimated and outputted on the basis of the interpolated target calculated from the second-order wave target which continues being detected, as described above. This makes it possible to continue detecting the fundamental wave target without interruption. Accordingly, it is possible to provide an object detection method which enables an object in a close range to be detected securely by a radar device.

2 Claims, 12 Drawing Sheets

(51) Int. Cl.
 *G01S 13/02* (2006.01)
 *G01S 13/20* (2006.01)

(56) References Cited

U.S. PATENT DOCUMENTS 6,693,583 B2 2/2004 Tamatsu et al.
2013/0271312 A1* 10/2013 Gallone et al. ............... 342/159

FOREIGN PATENT DOCUMENTS

| JP | 2003-270342 A | 9/2003 |
| JP | 2004-205279 A | 7/2004 |
| JP | 2006-300536 A | 11/2006 |
| JP | 2007-240369 A | 9/2007 |

* cited by examiner

Time:1

WHEN A FUNDAMENTAL WAVE TARGET IS DETECTED WITHIN A CLOSE RANGE, A DUMMY TARGET CORRESPONDING TO A SECOND-ORDER WAVE, WHOSE DISTANCE AND RELATIVE SPEED ARE DOUBLE THOSE OF THE FUNDAMENTAL WAVE TARGET, IS SET AT A POSITION WHICH IS AT THE SAME ANGLE AS THE FUNDAMENTAL WAVE TARGET IS DETECTED. A PREDETERMINED AREA WITH ITS CENTER AT THE DUMMY TARGET IS SET AS A SECOND-ORDER WAVE TARGET SEARCH AREA.

THE DUMMY TARGET WHICH CORRESPONDS TO THE SECOND-ORDER WAVE DERIVED FROM THE TARGET DETECTED WITHIN THE CLOSE RANGE IS CALCULATED AND HELD INSIDE.

○ : FUNDAMENTAL WAVE TARGET
◇ : DUMMY TARGET
▨ : SECOND-ORDER WAVE TARGET SEARCH AREA

FIG.6

Time:2

IN A CASE WHERE AN OUTPUT REPRESENTING DETECTION OF A TARGET WITHIN THE SECOND-ORDER WAVE TARGET SEARCH AREA EXISTS, A SECOND-ORDER WAVE TARGET FLAG IS ASSIGNED TO THE OUTPUT. (THE TARGET IS JUDGED AS THE SECOND-ORDER WAVE TARGET WHICH CORRESPONDS TO THE FUNDAMENTAL WAVE TARGET.)

○ : FUNDAMENTAL WAVE TARGET
△ : SECOND-ORDER WAVE TARGET
◇ : DUMMY TARGET
▨ : SECOND-ORDER WAVE TARGET SEARCH AREA

OBJECT DETECTION METHOD

TECHNICAL FIELD

The present invention relates to an object detection method in which an electromagnetic wave is transmitted from transmission/reception means to a predetermined area set in a direction in which a subject vehicle is running; a reflected wave produced by reflection of the electromagnetic wave off a target is received; and at least a direction and a distance of the target are detected on the basis of the received reflected wave.

BACKGROUND ART

Patent Document 1 given below has made publicly known an FM•CW radar system of a type which is designed: to alternately transmit an FM•CW wave and a CW wave in a case where one of an increase side peak signal and a decrease side peak signal of an object existing within a close range is missing; and to calculate a distance and a relative speed of the object on the basis of a peak frequency of the other which is not missing on the FM•CW wave and a peak frequency on the CW wave.

Furthermore, Patent Document 2 given below has made publicly known an FM•CW radar system of another type which is designed to calculate a distance and a relative speed of an object by interpolating one from the other of an increase side peak signal and a decrease side peak signal of the object in a case where one of the increase side peak signal and the decrease side peak signal is buried in low-frequency noise.

PRIOR ART DOCUMENTS

Patent Documents

Patent Document 1: Japanese Patent Application Laid-open No. 2006-300536
Patent Document 2: Japanese Patent Application Laid-open No. 2004-205279

SUMMARY OF THE INVENTION

Problems to be Solved by the Invention

The invention as recited in Patent Document 1 given above, however, has a problem that the addition of a function of transmitting a CW wave to the FM•CW radar system is a factor of cost increase. In addition, the invention as recited in Patent Document 2 given above has a problem that in a case where both the increase side peak signal and the decrease side peak signal of the object are buried in low-frequency noise (when the object exists within the close range and the relative speed of the object is slow), the FM•CW radar system does not exert its function.

Incidentally, when a target like a vehicle ahead is detected by use of a vehicle radar system, a reception peak intensity of a reflected wave produced by reflection of a transmitted electromagnetic wave off the target needs to exceed a threshold which is set higher than a noise level. The threshold is set higher for a close range, and lower for a long range, in accordance with the attenuation of the electromagnetic wave. With regard to the long range, a distance at which the reception peak intensity of the reflected wave is lower than the threshold is a detection limit distance for the long range. On the other hand, with regard to the close range, a threshold even greater than floor noise, which is intrinsic to the radar system, is set for the purpose of preventing the floor noise from being falsely detected as the target. This threshold determines the detection limit distance for the close range.

With regard to the close range, the electromagnetic wave is susceptible to the direction of the three-dimensional curved surface of the reflecting surface off which the electromagnetic wave is reflected, because the area of a portion of the target on which the electromagnetic wave is incident is smaller. Accordingly, a phenomenon in which the reception peak intensity of the reflected wave is lower depending on the spots on which the electromagnetic wave is incident takes place in the close range. For this reason, as shown in FIG. 12(A), the target may be unable to be detected even within the close range in some cases, because the reception peak intensity of the reflected wave is lower than the threshold.

Figure 12:
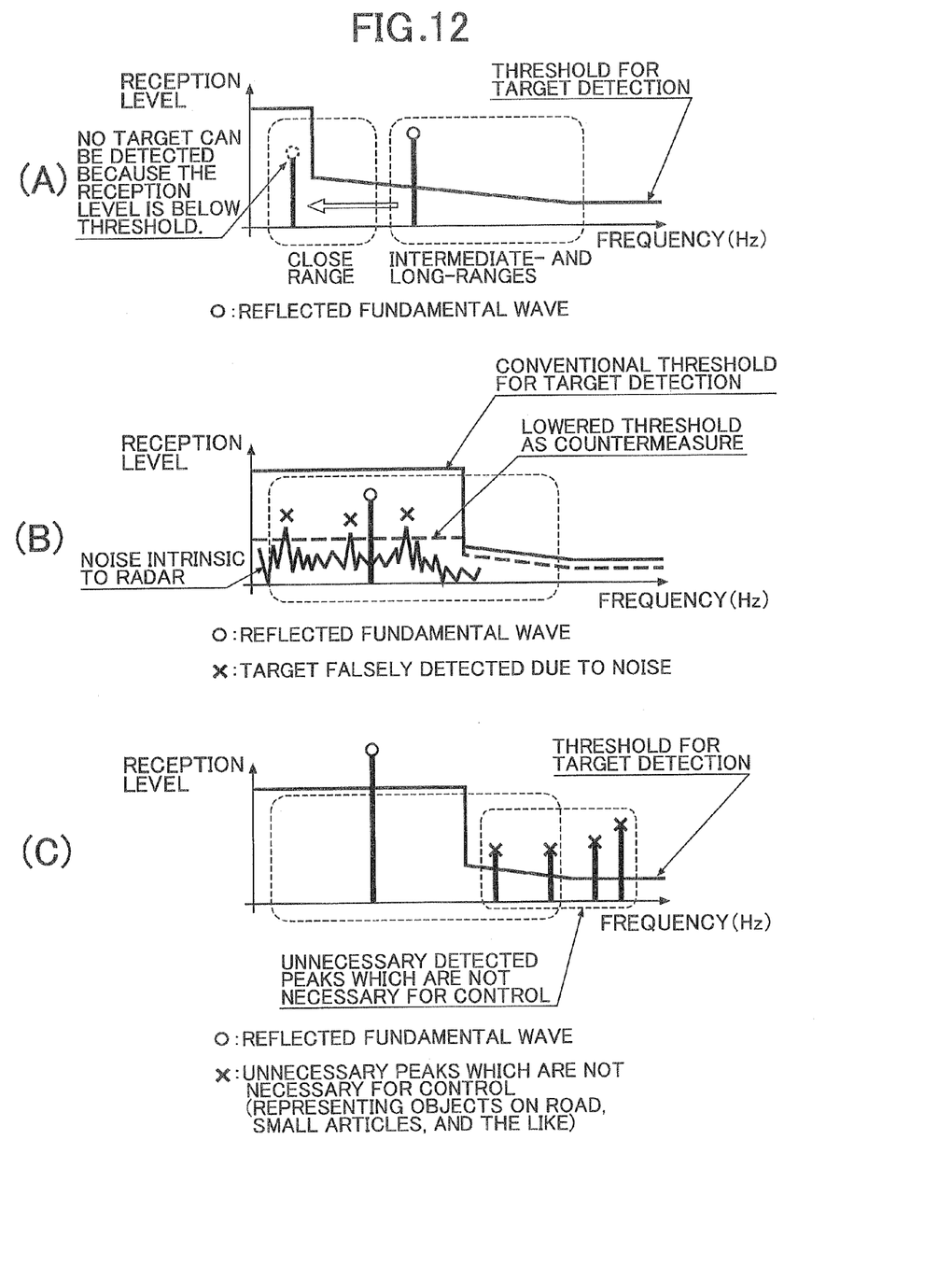
FIG. 12 is a diagram explaining a problem of the conventional example (conventional example).

A first conceivable solution to this problem is to prevent the reception peak intensity from becoming lower than the threshold by lowering the threshold in the close range, as shown in FIG. 12(B). However, this solution has a problem that false detection takes place because floor noise intrinsic to the radar system exceeds the threshold.

A second conceivable solution is to prevent the floor noise intrinsic to the radar system from exceeding the threshold by lowering the floor noise. However, this solution has a problem that the solution needs a large-scale modification to be made to the radar system; and thus is disadvantageous from the viewpoint of costs.

A third conceivable solution is to increase the transmission output of the electromagnetic wave from the radar system, as shown in FIG. 12(C). However, this solution has a problem that not only the upper limit of the transmission output of any electromagnetic wave is regulated by laws, but also a fallen object or the like on the road surface, other than the target itself like a vehicle ahead, may be falsely detected as the target due to the stronger electromagnetic wave.

The present invention has been made with the foregoing situations taken into consideration. An object of the present invention is to provide an object detection method which enables an object in a close range to be detected securely.

Means for Solving the Problems

In order to attain the above object, according to a first aspect of the present invention, there is provided an object detection method in which an electromagnetic wave is transmitted from transmission/reception means to a predetermined area set in a direction in which a subject vehicle is running; a reflected wave produced by reflection of the electromagnetic wave off a target is received; and at least a direction and a distance of the target are detected on the basis of the received reflected wave, characterized by comprising: a first step of setting a dummy target in a direction which is the same direction as that of the detected target, and at a position whose distance is double that of the detected target; a second step of setting a second-order wave target detection area in a predetermined area including the position of the dummy target; a third step of judging the target, which is detected in the second-order wave target detection area, as being a second-order wave target; a fourth step of setting an interpolated target in a direction which is the same as that of the second-order wave target, and at a position whose distance is half that of the second-order wave target; a fifth step of setting a fundamental wave target detection region in a predetermined area including the position of the interpolated target; and a sixth step of outputting the interpolated target as a fundamental wave target in a case where no fundamental wave target is detected in the fundamental wave target detection region.

Furthermore, according to a second aspect of the present invention, in addition to the first aspect, there is provided the object detection method, wherein the target detected in the first step is a target whose distance is less than a predetermined distance.

Here, a vehicle ahead Vb in an embodiment corresponds to the target of the present invention.

Effects of the Invention

According to the first aspect of the present invention, in the first step, the dummy target is set in the direction which is the same direction as that of the detected target, and at the position whose distance is double that of the detected target; in the second step, the second-order wave target detection area is set in the predetermined area including the position of the dummy target; in the third step, the target detected in the second-order wave target detection area is judged as being the second-order wave target; in the fourth step, the interpolated target is set in the direction which is the same as that of the second-order wave target, and at the position whose distance is half that of the second-order wave target; in the fifth step, the fundamental wave target detection region is set in the predetermined area including the position of the interpolated target; and in the sixth step, the interpolated target is outputted as the fundamental wave target in the case where no fundamental wave target is detected in the fundamental wave target detection region. Even if the fundamental wave target to be detected is undetected within a close range, data on the fundamental wave target is estimated and outputted on the basis of the interpolated target calculated from the second-order wave target which continues being detected, as described above. This makes it possible to continue detecting the fundamental wave target without interruption. In addition, a threshold for the target detection need not be lowered, and the transmission intensity of the electromagnetic wave need not be increased. This makes it possible to prevent false detection of noise and objects which need not be detected.

Furthermore, according to the second aspect of the present invention, in the first step, the detected target is that whose distance is less than the predetermined distance. This makes it possible to carry out this control only in the case where: the target exists within the close range; and there is a possibility that the second-order wave target may be detected. Accordingly, it is possible to prevent useless control from being carried out.

EXPLANATION OF REFERENCE NUMERALS AND SYMBOLS

M Transmission/reception means
Va Subject vehicle
Vb Vehicle ahead (target)

Mode for Carrying Out the Invention

A mode for carrying out the present invention is explained below based on FIG. 1 to FIG. 11.

First Embodiment

Figure 2:
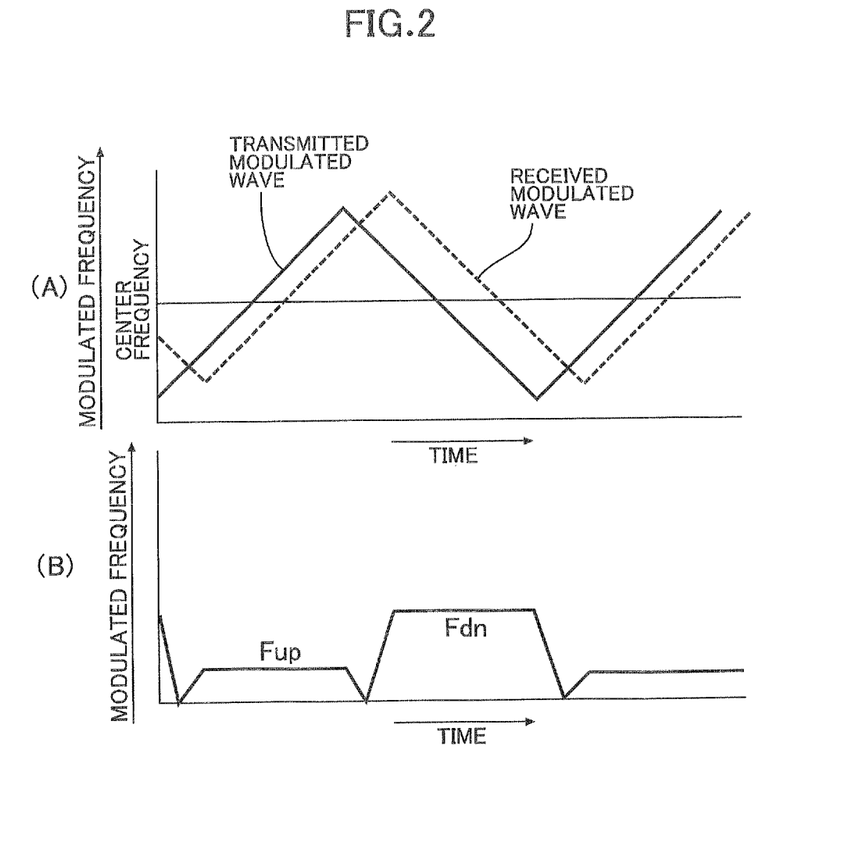
FIG. 2 is a graph showing a wave shape and a peak frequency of a transmitted/received wave when an object comes closer to transmission/reception means (first embodiment).
Figure 3:
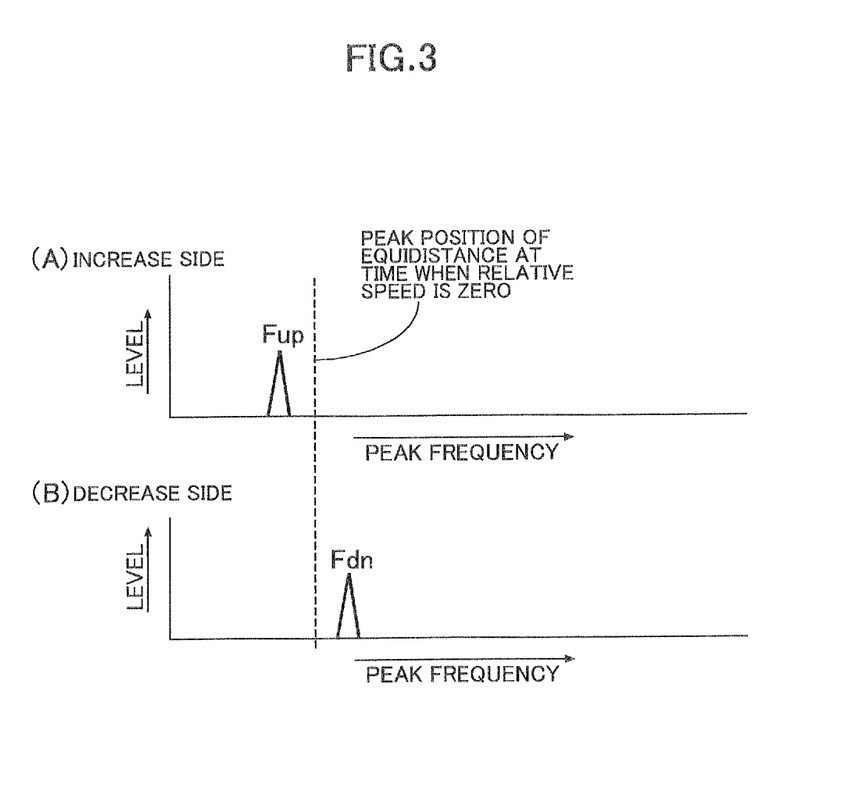
FIG. 3 is a graph showing a peak signal corresponding to FIG. 2 (first embodiment).

First, the configuration of a FM•CW radar system R will be explained below based on FIG. 1 to FIG. 3.

Figure 1:
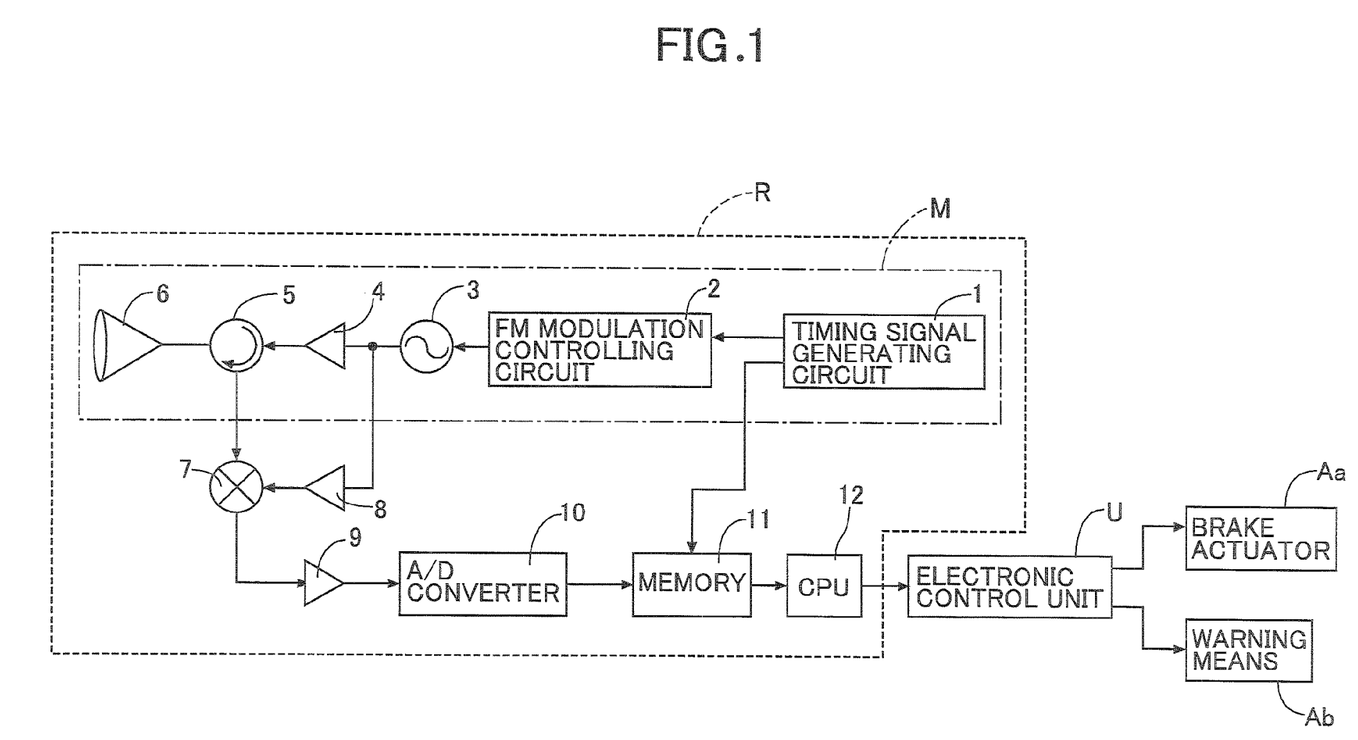
FIG. 1 is a diagram showing a configuration of a millimeter wave radar device (first embodiment).

As shown in FIG. 1, transmission/reception means M of the radar system R is configured to include a timing signal generating circuit 1, an FM modulation controlling circuit 2, an oscillator 3, an amplifier 4, a circulator 5, and a transmission/reception antenna 6. Based on a timing signal inputted from the timing signal generating circuit 1, the FM modulation controlling circuit 2 modulates and controls oscillation of the oscillator 3. Thus, as shown by a solid line in FIG. 2(A), the frequency of the signal is modulated into a frequency with triangular waveforms. The thus-modulated transmission signal from the oscillator 3 is inputted into the transmission/reception antenna 6 through the amplifier 4 and the circulator 5. As such, an FM•CW wave is transmitted from the transmission/reception antenna 6. When an object, such as a vehicle ahead, is ahead of the transmission/reception antenna 6, a reflected wave resulting from the transmitted wave reflecting off of the object is received by the transmission/reception antenna 6. The reflected wave appears, for instance, as shown by a broken line in FIG. 2(A), when the object ahead comes closer. On each increase side where the frequency of the transmitted wave linearly increases, the reflected wave appears with a frequency lower than that of the transmitted wave, and appears later than the transmitted wave. On each decrease side where the frequency of the transmitted wave linearly decreases, the reflected wave appears with a frequency higher than that of the transmitted wave, and appears later than the transmitted wave.

The radar system R further includes a mixer 7, an amplifier 8, an amplifier 9, an A/D converter 10, a memory 11, and a processing unit 12.

The received wave received by the transmission/reception antenna 6 is inputted into the mixer 7 through the circulator 5. In addition to the received wave from the circulator 5, a transmitted wave, which is distributed from the transmitted wave outputted from the oscillator 3, is inputted into the mixer 7 through the amplifier 8. The mixer 7 mixes the transmitted wave and the received wave. Thereby, as shown in FIG. 2(B), the mixer 7 generates a beat signal which has a peak frequency Fup on each increase side where the frequency of the transmitted wave linearly increases; and a peak frequency Fdn on each decrease side where the frequency of the transmitted wave linearly decreases.

The beat signal obtained by the mixer 7 is amplified to a predetermined amplitude level by the amplifier 9. The resultant beat signal is converted from analog to digital by the A/D converter 10 at each sampling time. Thus, a digitalized data is stored and retained in chronological order in the memory 11. The timing signal is inputted into the memory 11 from the timing signal generating circuit 1. In response to the timing signal, the memory 11 stores and retains the data on each increase side where the frequency of the transmitted/received signal increases, and on each decrease side where the frequency thereof decreases.

Based on the data stored in the memory 11, the processing unit 12 calculates a direction (detected angle), distance and relative speed of the object with the subject vehicle being the reference, and sends the calculation results to an electronic control unit U in a manner that is described below. Upon reception of the signal from the processing unit 12, the vehicle controlling means, which includes the electronic control unit U, controls the operations, respectively, of a brake actuator Aa for performing an automatic braking of the subject vehicle and warning means Ab, such as a buzzer or a lamp, for urging the drive to perform a braking operation voluntarily, for the purpose of avoiding the collision with a vehicle ahead or reducing the damage at the time of collision.

It should be noted that the search by the radar system R to detect a target is performed at cycles of 100 msec, for instance.

The processing unit 12 analyzes the frequency of the beat signal by applying the FFT (Fast Fourier Transform) to the data of the beat signal stored in the memory 11, and thus finds a spectral distribution. Based on the spectral data, the processing unit 12 detects a spectrum (a peak signal), the detection level of which reaches the maximum value that is equal to or more than a predetermined threshold. The peak signal on the increase side shown in FIG. 3(A) and the peak signal on the decrease side shown in FIG. 3(B) are detected symmetrically with respect to a peak position at a time when the relative speed between the subject vehicle and the object is "zero". Hence, based on the peak frequency Fup on the increase side and the peak frequency Fdn on the decrease side, the processing unit 12 calculates the distance of the object from the subject vehicle and the relative speed between the object and the subject vehicle. Specifically, the processing unit 12 calculates the distance of the subject vehicle to the object based on the sum of the two peak frequencies Fup, Fdn, and the relative speed between the subject vehicle and the object based on the difference between the two peak frequencies Fup, Fdn. Furthermore, based on the direction in which the transmitted wave is transmitted when the object is detected, the processing unit 12 calculates the direction (detected angle) of the object.

Figure 4:
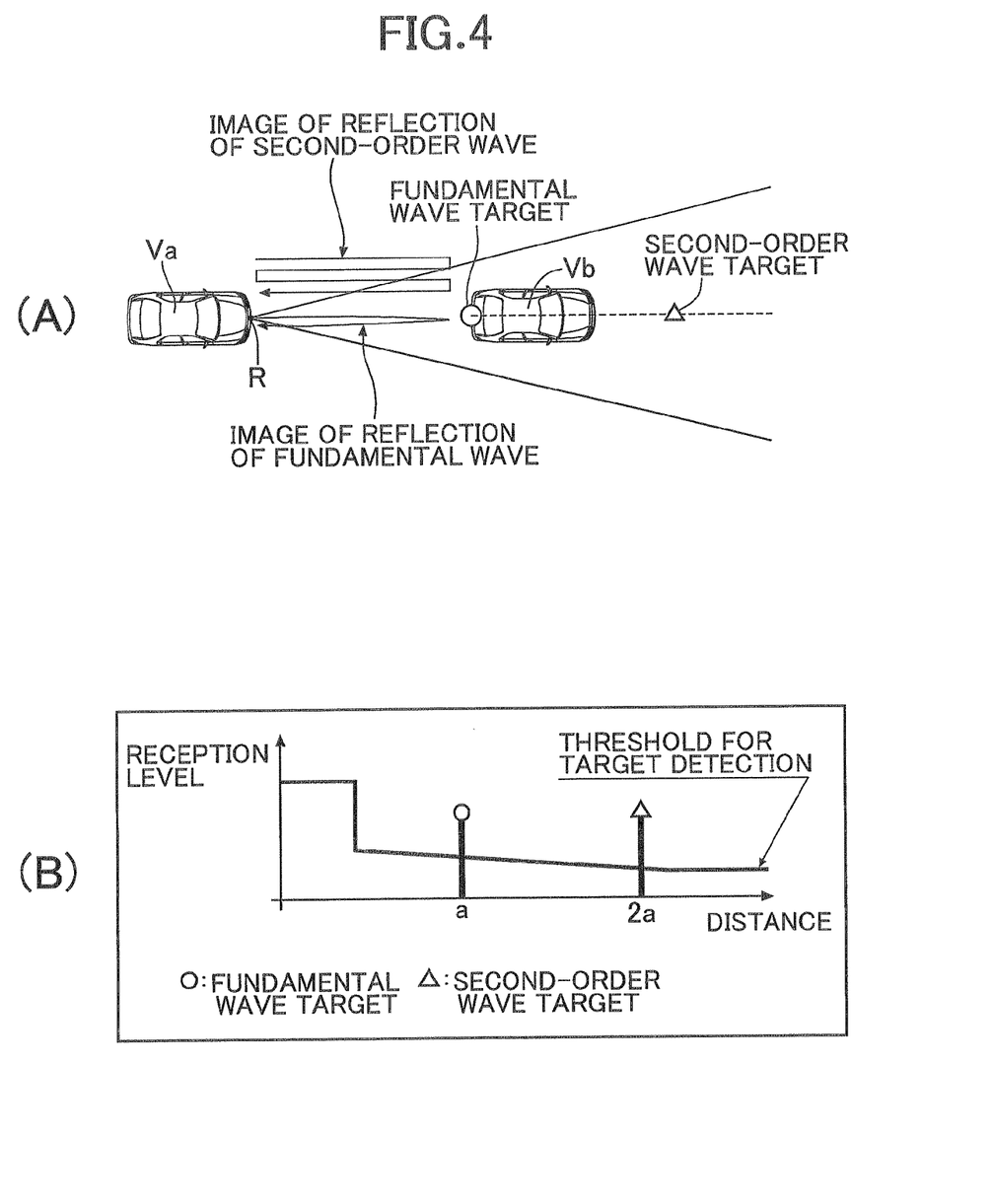
FIG. 4 is a diagram explaining a principle of the present invention (first embodiment).

Next, descriptions will be provided for a basic principle of the present invention on the basis of FIG. 4.

In a case where a vehicle ahead Vb exists within a close range of a subject vehicle Va, the vehicle ahead Vb is detected at a distance a when an electromagnetic wave transmitted by the radar system R of the subject vehicle Va is received by the radar system R after reflected off the vehicle ahead Vb. The vehicle ahead Vb of this case is called as a fundamental wave target. On the other hand, there is a case in which a vehicle ahead Vb is detected as if it exists at a distance 2a when an electromagnetic wave transmitted by the radar system R of the subject vehicle Va is received by the radar system R after its reflection off the vehicle ahead Vb to the subject vehicle Va, and its subsequent reflection off the front surface of the subject vehicle Va and frontward travel, as well as its another reflection off the vehicle ahead Vb. The vehicle ahead Vb of this case is called as a second-order wave target. Although the second-order wave target is detected in the same direction as is the fundamental wave target, not only the distance of the second-order wave target is twice as long as the distance of the fundamental wave target, but also a relative speed of the second-order wave target is twice as fast as that of the fundamental wave target. For this reason, if the fundamental wave target is undetected within the close range, an interpolated target which is situated in the same direction as is the second-order wave target and whose distance and relative speed are half of those of the second-order wave target is calculated, and the undetected fundamental wave target can be compensated by this interpolated target.

It may be conceived that a third-order wave target is detected when the electromagnetic wave is reflected between the subject vehicle Va and the vehicle ahead Vb by one more round trip. In reality, however, the third-order wave target or a higher-order wave target is rarely detected, because the attenuation of the electromagnetic wave is larger as the number of times the electromagnetic wave is reflected is larger. In addition, since the attenuation of the electromagnetic wave is large when the distance of the vehicle ahead Vb is long, the detection of the second-order wave target is limited to a case where the distance of the vehicle ahead Vb falls within the close range of the subject vehicle Va (for example, within 10 meters).

Figure 5:
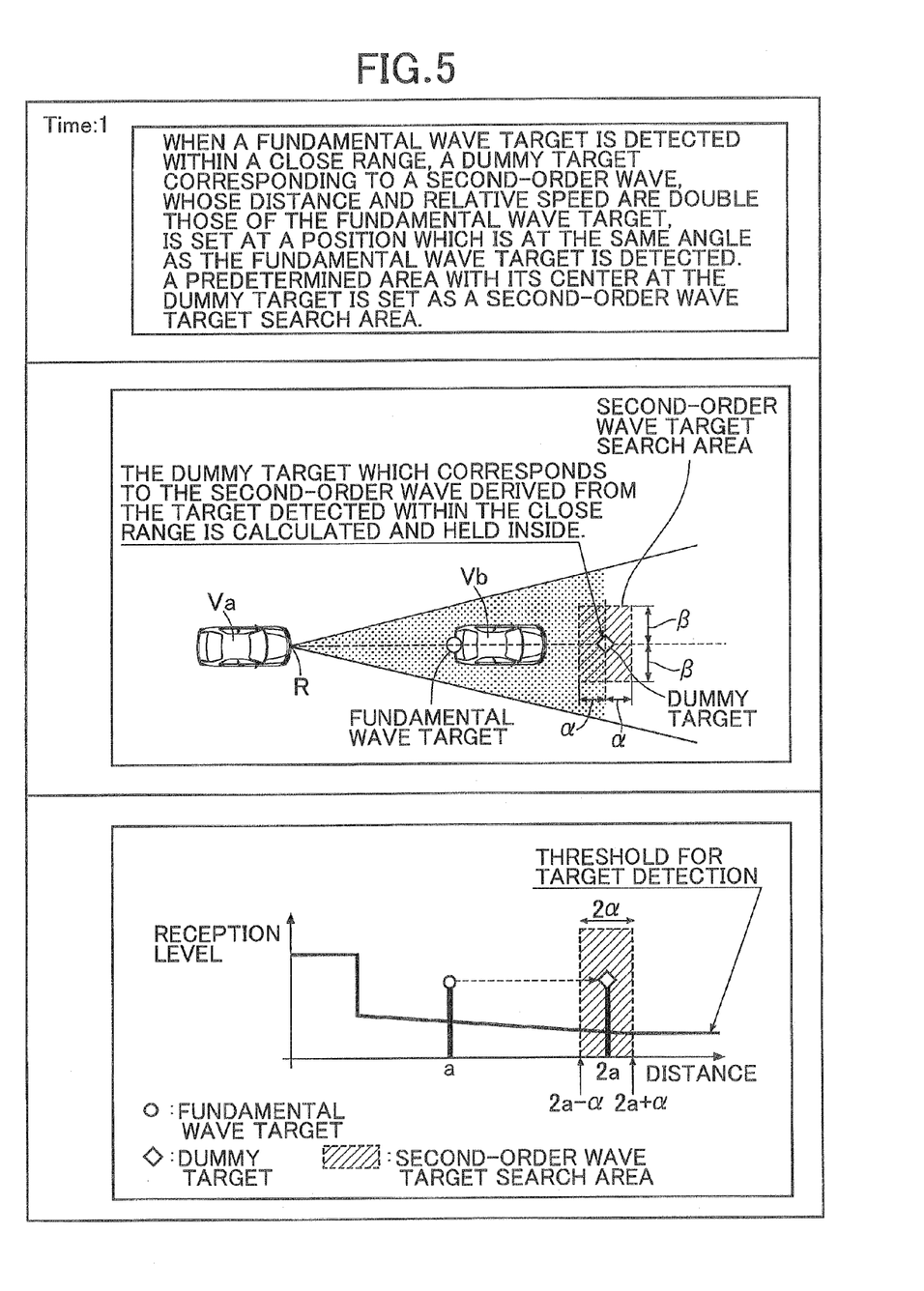
FIG. 5 is an operation explanatory diagram (Time 1) of an embodiment (first embodiment).
Figure 6:
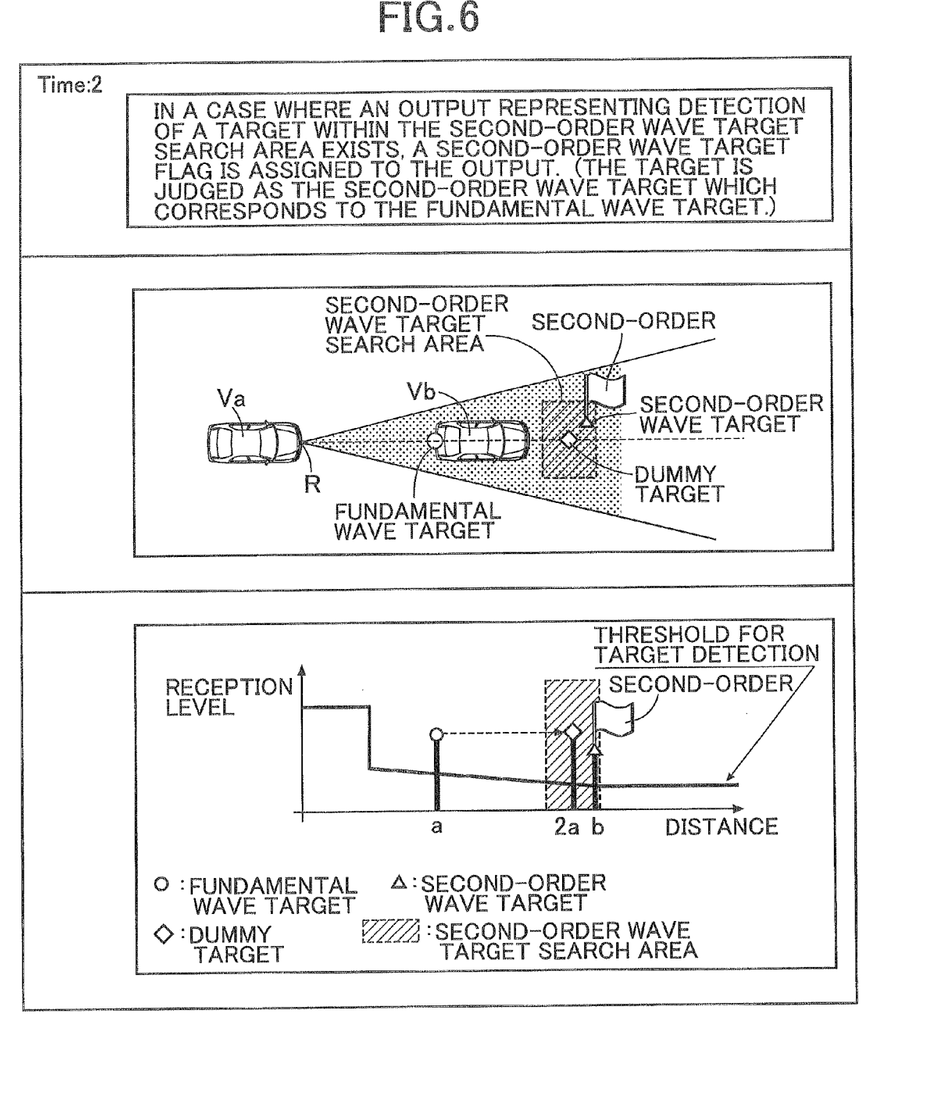
FIG. 6 is an operation explanatory diagram (Time 2) of the embodiment (first embodiment).
Figure 7:
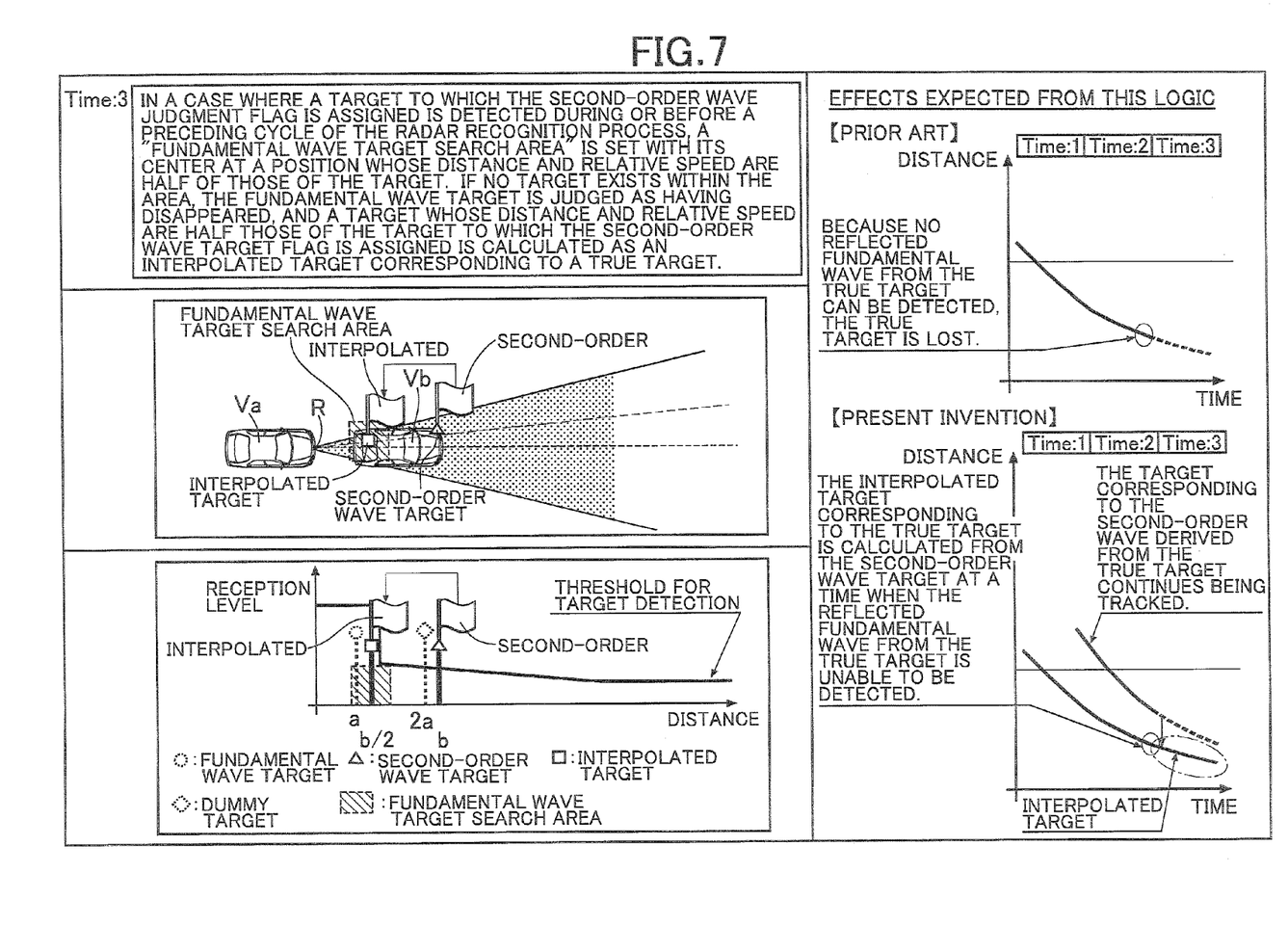
FIG. 7 is an operation explanatory diagram (Time 3) of the embodiment (first embodiment).

Next, descriptions will be provided for a concrete logic of the present invention on the basis of FIGS. 5 to 7.

As shown in FIG. 5 (Time 1), when a target (fundamental wave target) of the vehicle ahead Vb is detected at a position at a short distance a from the subject vehicle Va, a dummy target is set at a position 2a whose distance is double that of the fundamental wave target in the same direction as the fundamental wave target is detected, and a second-order wave target search area having a predetermined size with its center at the dummy target is set as well. The width of the second-order wave target search area in the front-rear direction (the direction in which the subject vehicle Va is running) is ±α (for example, α is 1 m) relative to the position of the dummy target. The width of the second-order wave target search area in the left-right direction (the direction orthogonal to the direction in which the subject vehicle Va is running) has an angle of ±β (for example, β is 3 deg) relative to the position of the dummy target.

As shown in FIG. 6 (Time 2), if the target is detected within the second-order wave target search area, the target is judged as the second-order wave target which corresponds to the fundamental wave target, and a second-order wave target flag is assigned to the second-order wave target.

As shown in FIG. 7 (Time 3), once the second-order wave target is detected during the preceding process, an interpolated target is set at a position whose distance b/2 is half the distance b of the second-order wave target is set, and a fundamental wave target search area having a predetermined size with its center at the interpolated target is set as well. The width of the fundamental wave target search area in the front-rear direction is ±α (for example, α is 1 m) relative to the position of the interpolated target. The width of the fundamental wave target search area in the left-right direction has an angle of ±β (for example, β is 3 deg) relative to the position of the interpolated target. It goes without saying that for each loop, the position of the fundamental wave target search area is updated in accordance with change in a positional relationship between the subject vehicle Va and the vehicle ahead Vb.

While the fundamental wave target (the true target) is being detected, the fundamental wave target is supposed to exist within the fundamental wave target search area. If the vehicle ahead Vb is undetected as the vehicle ahead Vb comes closer to the subject vehicle Va, the undetected fundamental wave target is replaced with the interpolated target. This makes it possible to continue the vehicle control without any interruption by using the interpolated target as the fundamental wave target, even if the fundamental wave target is undetected as the distance between the subject vehicle Va and the vehicle ahead Vb is shorter.

In addition, since the threshold for detecting the target need not be set at a low value, and since the output of the radar system R need not be increased, discrepancy like false detection of floor noise of the radar system R or false detection of a fallen object on the road surface does not occur. Furthermore, the object detection can be realized by changing only the software without changing the hardware of the radar system R, and thus the costs are low.

Detailed descriptions will be provided for the foregoing operation on the basis of flowcharts shown in FIGS. 8 to 11.

Figure 8:
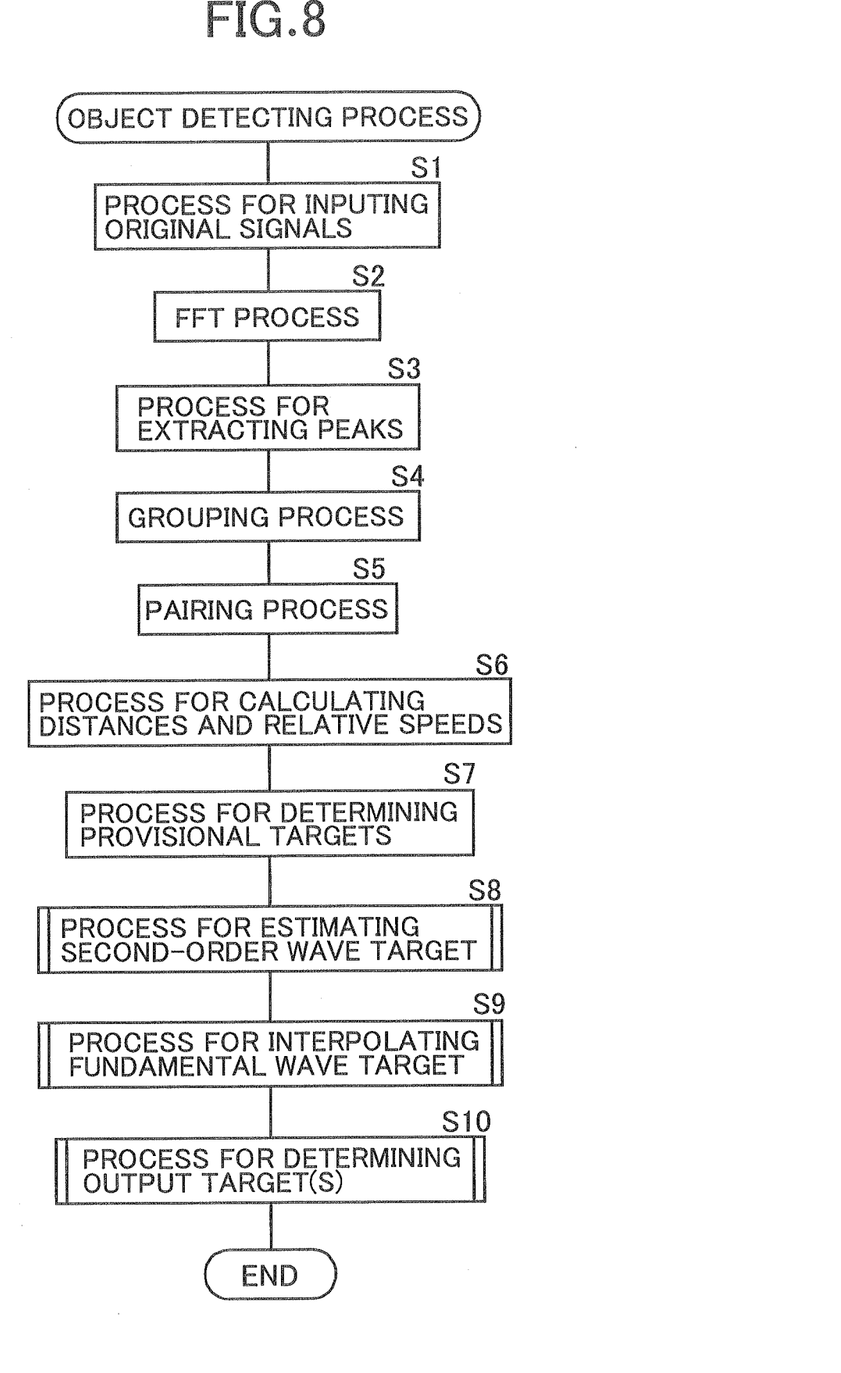
FIG. 8 is a flowchart of a main routine (first embodiment).

First of all, in step S1 in FIG. 8, signals received by the radar system R are inputted into the processing unit 12. In step S2, for each of the received signals, a spectral distribution is obtained by performing a frequency analysis on the received signal by use of FFT (fast Fourier transform). In step S3, spectra (peak signals) at which the reception intensities take on their respective maximum values in a range not less than a predetermined threshold are detected on the basis of the spectral data. In ensuing step S4, sets of grouping data are acquired by carrying out a grouping process to group the multiple peak signals into groups each consisting of peak signals associated with the same target. Since in step S5, an increase side grouping data and a decrease side grouping data, which are associated with the same target, are paired with each other, in step S6, the distances and relative speeds of each target are calculated. Thereafter, in step S7, the targets detected in step S6 are determined as provisional targets.

In ensuing step S8, for each provisional target, it is judged whether or not the second-order wave target corresponding to the provisional target, whose distance and relative speed are double those of the provisional target exits. In ensuing step S9, the fundamental wave target is interpolated by use of an interpolated target whose distance and relative speed, obtained from those of the second-order wave target by an inverse calculation, are half those the second-order wave target. Thereafter, in step S10, a final output target is determined.

The processes to be performed in steps S1 to S7, which have been described above, are substantially the same as those to be performed in the conventional radar system. The processes to be performed in steps S8 to S10, which have been described above, are novel ones.

Figure 9:
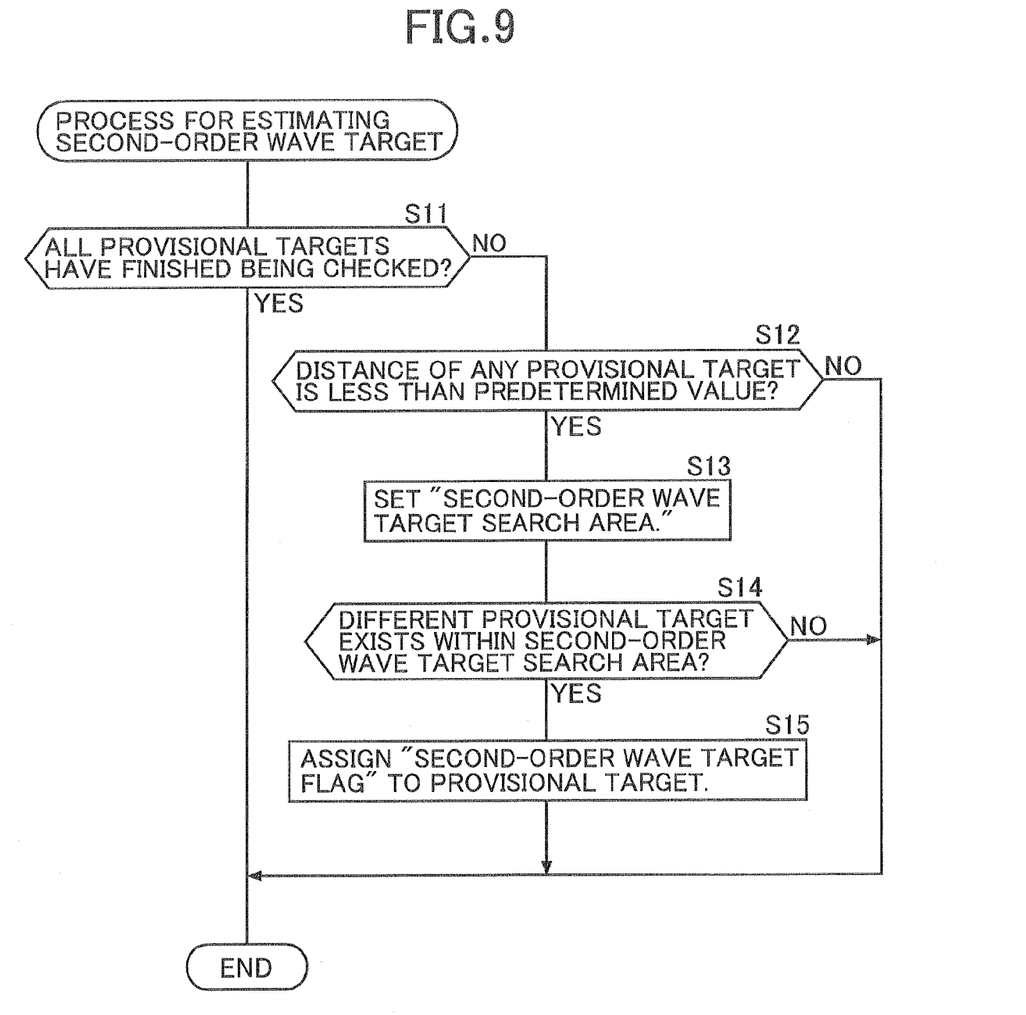
FIG. 9 is a flowchart of a subroutine at Step 8 (first embodiment).

Next, descriptions will be provided for a subroutine for step S8 (a process for estimating the second-order wave target) on the basis of a flowchart shown in FIG. 9.

To begin with, if it is judged in step S11 that all the provisional targets have finished being checked, this routine is terminated. If it is judged in step S11 that all the provisional targets have not finished being checked yet, it is judged in step S12 whether or not the distance of any provisional target is less than a predetermined value (for example, 10 meters). The predetermined value is set as a value indicating that the second-order wave target may be detected within a distance less than the value. If it is judged in step S12 that the distance of some provisional target is less than the predetermined value, the second-order wave target search area (see FIG. 5) is set in step S13. If it is judged in ensuing step S14 that a different provisional target exists within the second-order wave target search area, the provisional target is judged as being the second-order wave target, and the second-order wave target flag (see FIG. 6) is assigned to the provisional target.

Next, descriptions will be provided for a subroutine for step S9 (a process for interpolating the fundamental wave target), which has been described above, on the basis of a flowchart shown in FIG. 10.

Figure 10:
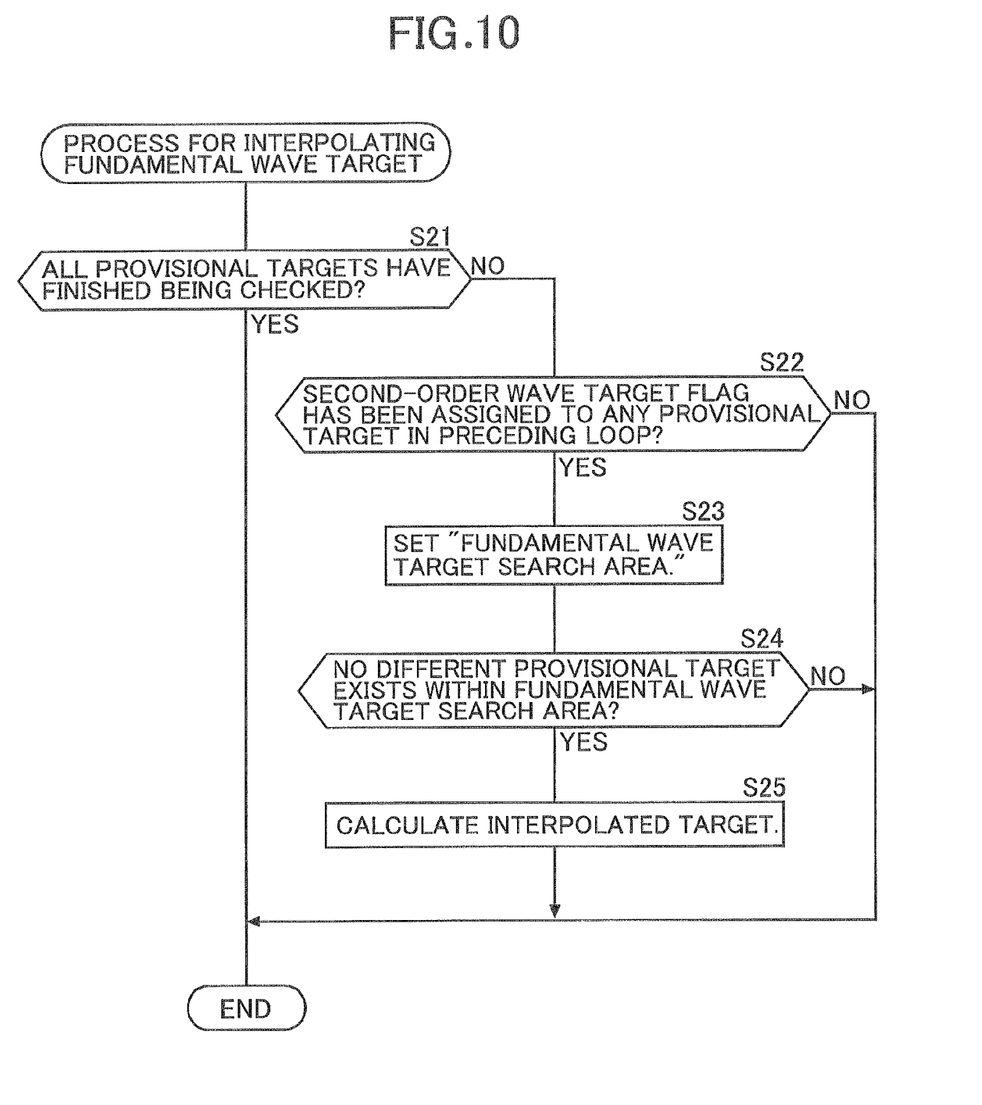
FIG. 10 is a flowchart of a subroutine at Step 9 (first embodiment).

First of all, if it is judged in step S21 that all the provisional targets have finished being checked, this routine is terminated. If it is judged in step S21 that all the provisional targets have not finished being checked yet, it is judged in step S22 whether or not the second-order wave target flag has been assigned to any provisional target in the preceding loop. If it is judged in step S22 that the second-order wave target flag has been assigned to some provisional target, the fundamental wave target search area (see FIG. 7) is set in step S23. If it is judged in ensuing step S24 that no different provisional target exists within the fundamental wave target search area, the interpolated target (see FIG. 7) whose distance and relative speed are half those of the second-order wave target is calculated in step S25.

Next, descriptions will be provided for a subroutine for step S10 (the process for determining the output target), which has been described above, on the basis of a flowchart in FIG. 11.

Figure 11:
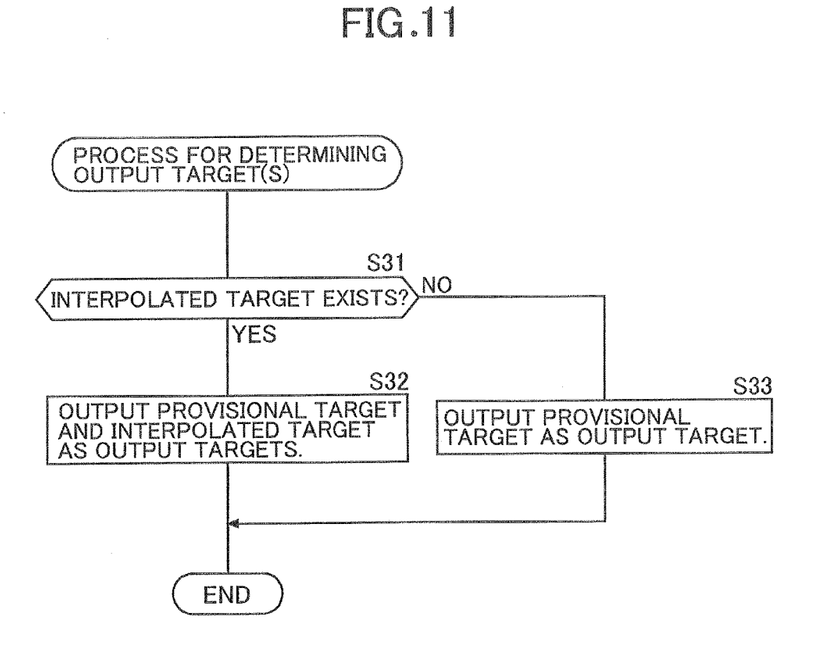
FIG. 11 is a flowchart of a subroutine at Step 10 (first embodiment).

First of all, if it is judged in step S31 that the interpolated target to which the interpolated target flag is assigned has been set, the provisional target and the interpolated target are outputted as the output targets for vehicle control in step S32. If it is judged in step 31 that no interpolated target has been set yet, the provisional target is outputted as the output target for vehicle control in step S33.

As described above, when the fundamental wave target corresponding to the vehicle ahead Vb is lost because the distance between the subject vehicle Va and the vehicle ahead Vb is shorter, the lost fundamental wave target is compensated by the interpolated target whose distance and relative speed are half those of the second-order wave target. Thereby, the vehicle control can be continued without interruption even if the fundamental wave target is lost.

Although the foregoing descriptions have been provided for the embodiment of the present invention, various design changes can be made to the present invention within a range not departing from the gist of the present invention.

For example, the width of the second-order wave target search area and the width of the fundamental wave target search area can be changed as necessary without being limited to the embodiment.

In addition, the target in the present invention is not limited to the vehicle ahead Vb in the embodiment.

The invention claimed is:

1. An object detection method in which an electromagnetic wave is transmitted from transmission/reception means (M) to a predetermined area set in a direction in which a subject vehicle (Va) is running; a reflected wave produced by reflection of the electromagnetic wave off a target (Vb) is received; and at least a direction and a distance of the target (Vb) are detected on the basis of the received reflected wave, characterized by comprising:
    a first step of setting a dummy target in a direction which is the same direction as that of the detected target (Vb), and at a position whose distance is double that of the detected target (Vb);
    a second step of setting a second-order wave target detection area in a predetermined area including the position of the dummy target;
    a third step of judging the target (Vb), which is detected in the second-order wave target detection area, as being a second-order wave target;

a fourth step of setting an interpolated target in a direction which is the same as that of the second-order wave target, and at a position whose distance is half that of the second-order wave target;

a fifth step of setting a fundamental wave target detection region in a predetermined area including the position of the interpolated target; and a sixth step of outputting the interpolated target as a fundamental wave target in a case where no fundamental wave target is detected in the fundamental wave target detection region.

2. The object detection method according to claim 1, wherein the target (Vb) detected in the first step is a target (Vb) whose distance is less than a predetermined distance.

* * * * *